Patented June 13, 1939

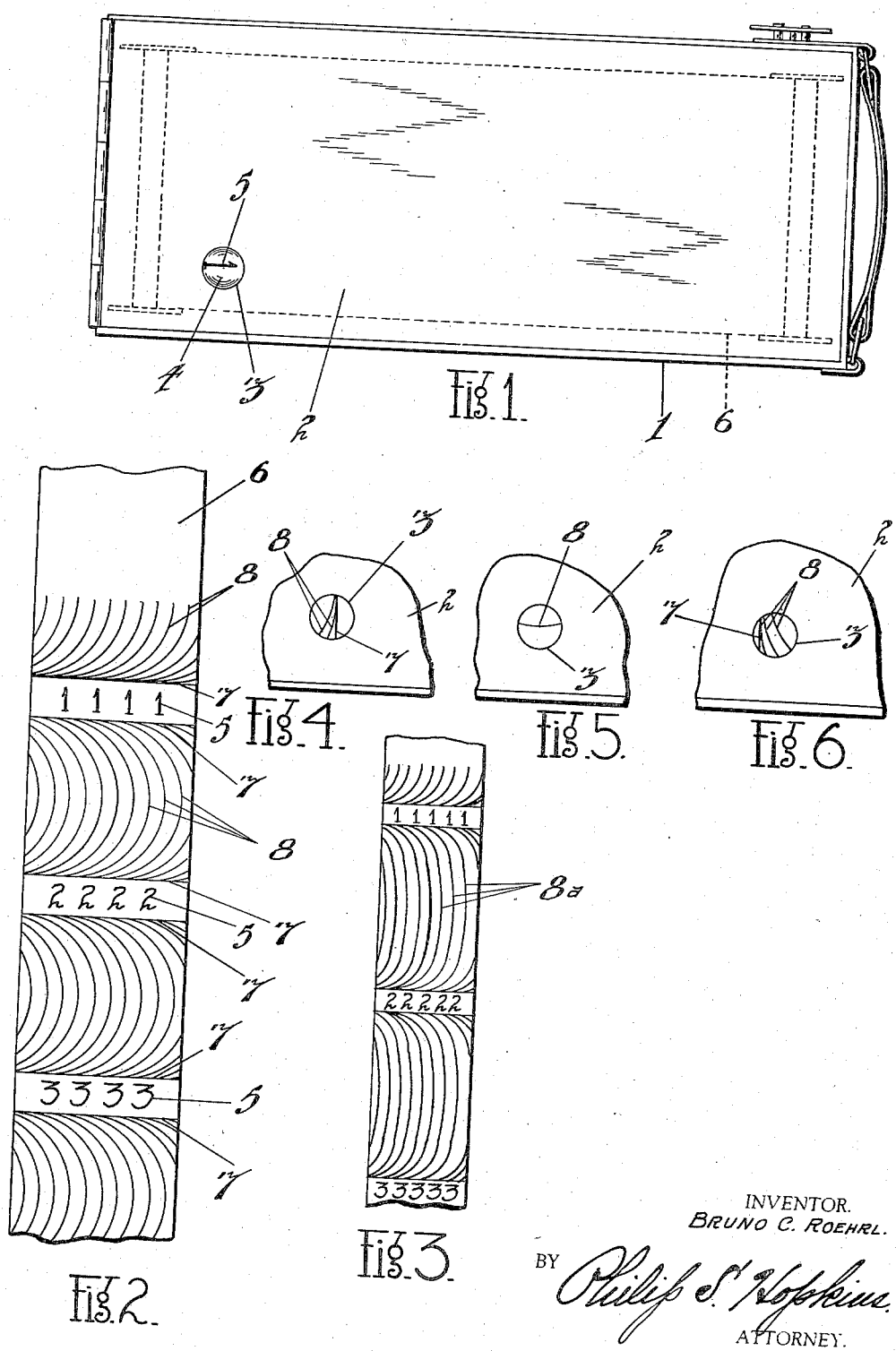

2,162,408

UNITED STATES PATENT OFFICE 2,162,408

MARKING MEANS FOR FILM STRIPS

Bruno C. Roehrl, Binghamton, N. Y., assignor, by mesne assignments, to Agfa Ansco Corporation, Binghamton, N. Y., a corporation of Delaware Application September 26, 1936, Serial No. 102,789

3 Claims. (Cl. 95—9)

My invention pertains to marking means for film strips and particularly to the protective paper backing with which a strip of sensitized film is rolled and which strip is provided with spaced film section markings visible through a peephole in the back of the camera so as to indicate the proper positioning of the film for each exposure and the number thereof.

It sometimes occurs through carelessness or inadvertence that in winding the film through the camera from one exposure section to the next, these indicating marks pass by the peephole unnoticed, creating confustion in the mind of the user as to whether the proper winding has taken place or not. This results in the operator either taking a chance on having properly wound the film with the consequent risk of double exposure, or winding on until the next number appears with the possible loss of a section which might otherwise have been exposed.

The camera peephole through wich the indicating marks are observed, is usually small and the indicating numbers are likewise relatively small. This requires a great deal of care on the part of the user of the camera in winding the film slowly so as not to miss the number when it appears through the peephole. The peepholes are usually colored red so as to filter out any actinic light passing therethrough and this coloring reduces the ease with which the indications are seen through the peephole.

It is also true that in most cases the protective backing paper is also red in color, which further renders difficult the clear observance of the movement of the film and paper from one position to the next.

The principal object of my invention is to provide an indicating means on the film backing paper between the section marks which means are visible through the peephole at all times and which, by their character and arrangement, clearly indicate the approach of the next indicating mark. This means that the film can be rapidly wound from one section to the next and the approach of the next section mark is clearly indicated, thus greatly reducing the danger of overrunning or stopping short.

More specifically, my invention comprises the use of curved lines extending between the section marks on the film backing paper, such curved lines being concentrically arranged and terminating in a straight line directly adjacent each section number or mark.

It is an object of my invention to arrange these curved lines in such manner that at least one of them will always be visible through the peephole of the camera during the movement of the film from one section to the next and so that the visible curved line or lines will be substantially horizontal nearest the indicating marks and substantially vertical at a point substantially centrally between the marks.

Other objects and advantages will be apparent as the description proceeds, reference now being had to the figures of the accompanying drawing forming a part of this invention, wherein like reference numerals indicate like parts.

In the drawing Figure 1 is a rear plan view of a conventional photographic camera showing the peephole through which the film section marks are visible.

Figure 2 is a detail plan view of a portion of a strip of film backing paper showing the section marks and my indicating marks therebetween.

Figure 3 is a similar view showing a slightly different arrangement of the curved lines.

Figure 4 is a detail view of the camera peephole illustrating the appearance of the curved lines therethrough just as the strip is starting from one section mark toward the next.

Figure 5 is a similar detail view illustrating the appearance of one of the curved lines at substantially a central point between two section marks.

Figure 6 is a similar detail view illustrating the appearance of the curved lines just as the strip approaches the next section mark.

The reference character 1 indicates generally a photographic camera which has been illustrated as of the folding type, but which may be of any desired type or construction. This camera is provided with a back 2 in which is provided the peephole or window 3, suitably covered as at 4 by Celluloid or glass—usually of a color to filter out actinic rays, but of sufficient transparency to permit observing the film section marks 5 thereunder.

The film backing or protecting strip 6 is provided with the section marks 5 at spaced intervals and corresponding in number to the number of exposure sections provided on the film. Each of these section marks is usually plural in number in order that at least one of them will appear through the peephole 3.

On either side of the section marks 5 and directly adjacent thereto are provided the straight lines 7 between which the section marks are placed.

Extending between spaced section marks 5 and beginning with the straight lines 7 next adjacent thereto, are a plurality of curved lines 8 so arranged that their ends terminate close together and coincident with the straight lines 7. In between the straight lines 7 the curved lines spread apart somewhat as shown and at substantially the central point between the section marks, the curved lines are substantially vertical.

These curved lines 8 are also provided just ahead of the first section mark on the strip. Thus when the camera has been first loaded and the film is being wound to the first exposure position, these indicating lines also are effective for indicating the approaching to the first section mark.

It will be noted that with this arrangement of curved lines, the same are substantially horizontal at the point where they coincide with the straight lines 7 adjacent the indicating section marks.

The result is that when the film strip with its backng strip 6 is wound through the camera, one or more of the curved lines 8 are visible through the peephole 3 and by watching such lines as they pass the peephole, it is clearly indicated to the operator the position of the strip and especially the approach of the next section mark. For instance, in Figure 4 the straight line 7 is visible together with two of the curved lines 8 as they diverge from the straight line 7. In this position it is clearly indicated that the film strip has just been started in its winding from one of the section marks toward the next.

As the winding continues and approaches the central point between the section marks, one of the lines 8 appears substantially centrally through the peephole and in a substantially vertical position.

As the winding brings the strip adjacent the next section mark, the curved lines converge to substantially horizontal position again as the next straight line 7 appears in view, thus warning the operator that only a very slight additional winding is necessary to bring the film into proper position for the next exposure.

In actual operation, the passage of the curved lines 8 beneath the peephole gives the effect of such lines racing from one converging point to another converging point, thus giving ample indication and warning of the location of the section marks.

In Figure 3 the curved lines 8A are shown as slightly more elongated than the lines 8 of Figure 2. This design and arrangement may be advantageous in the case of larger sized films where the section marks are spaced further apart.

It will be understood that changes may be made in details of arrangement without departing from the spirit and scope of my invention. I do not limit myself, therefore, to the exact form herein shown and described other than by the appended claims.

I claim:

1. A roll film having an opaque protective strip provided with film section marks in spaced relation, a curved indicating line between each of said marks, said line having a direction substantially transverse of the strip adjacent each section mark and substantially lengthwise of the strip in the portion of said lines intermediate the section numbers to indicate the approach of the succeeding film section mark.

2. A roll film having an opaque protective strip provided with film section marks in spaced relation, a plurality of closely spaced curved indicating lines between each of said marks, said lines having a direction substantially transverse of the strip adjacent each section mark and substantially lengthwise of the strip in the portion of said lines intermediate the section numbers to indicate the approach of the succeeding film section mark.

3. A roll film having an opaque protective strip provided with film section marks in spaced relation, a plurality of closely spaced curved indicating lines between each of said marks, said lines having a direction substantially transverse of the strip adjacent each section mark and substantially lengthwise of the strip in the portion of said lines intermediate the section numbers to indicate the approach of the succeeding film section mark, said lines converging together adjacent said marks.

BRUNO C. ROEHRL.